United States Patent [19]

Tame

[11] Patent Number: 5,511,442
[45] Date of Patent: Apr. 30, 1996

[54] CONTROL SYSTEM WITH BOWDEN WIRE ASSEMBLY END CLIP

[75] Inventor: Omar D. Tame, W. Bloomfield, Mich.

[73] Assignee: Atoma International, Inc., Newmarket, Canada

[21] Appl. No.: 299,645

[22] Filed: Sep. 2, 1994

[51] Int. Cl.⁶ ....................................................... F16C 1/22
[52] U.S. Cl. .................................................... 74/502.6
[58] Field of Search ............................... 74/502.6–502.4; 403/327, 328, 329; 24/584, 585

[56] References Cited

U.S. PATENT DOCUMENTS

| 3,513,718 | 5/1970 | Tomecek . | |
|---|---|---|---|
| 4,185,515 | 1/1980 | Webb | 74/502.4 |
| 4,244,238 | 1/1981 | Suzuki et al. . | |
| 4,805,479 | 2/1989 | Brightwell . | |
| 5,207,116 | 5/1993 | Sultze | 74/502.6 X |
| 5,230,257 | 7/1993 | Nowak | 74/502.6 X |
| 5,295,408 | 3/1994 | Nagle et al. | 74/502.6 |
| 5,394,770 | 3/1995 | Boike et al. | 74/502.4 |

FOREIGN PATENT DOCUMENTS 2686663  7/1993  France .................................. 74/502.6

Primary Examiner—Rodney H. Bonck
Assistant Examiner—Mary Ann Battista
Attorney, Agent, or Firm—Cushman, Darby & Cushman

[57] ABSTRACT

A remote control system for a vehicle or the like including a flexible Bowden wire assembly having an outer sheath and a wire movably mounted within the sheath so as to expose proximal and distal ends extending from proximal and distal ends of the sheath respectively, a first actuator mounted for movement in a first location, a second actuator mounted for movement in a remote second location, the sheath being extended between the first and second locations and having the proximal end thereof fixed in spaced relation to the first actuator and the remote end thereof fixed in spaced relation to the second actuator. One of the ends of the Bowden wire is fixed to one of the actuators. The other end of the Bowden wire has an elongated member fixed thereto so as to extend axially therefrom, the elongated member has a series of axially spaced annular grooves formed in the exterior periphery thereof. A sheet metal clip is pivotally carried by the other of the actuators and includes spaced biting edges constructed and arranged to receive a pair of annular grooves of the elongated member to retain the elongated member in a selected position of axial adjustment with respect to the clip and against movement in the direction of extent of the wire.

8 Claims, 2 Drawing Sheets

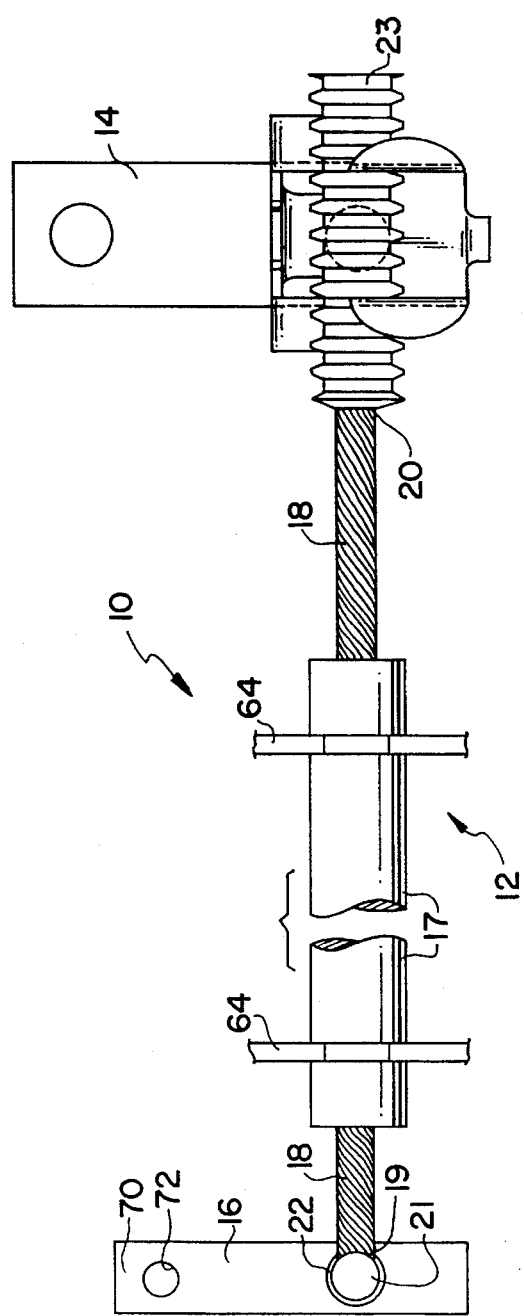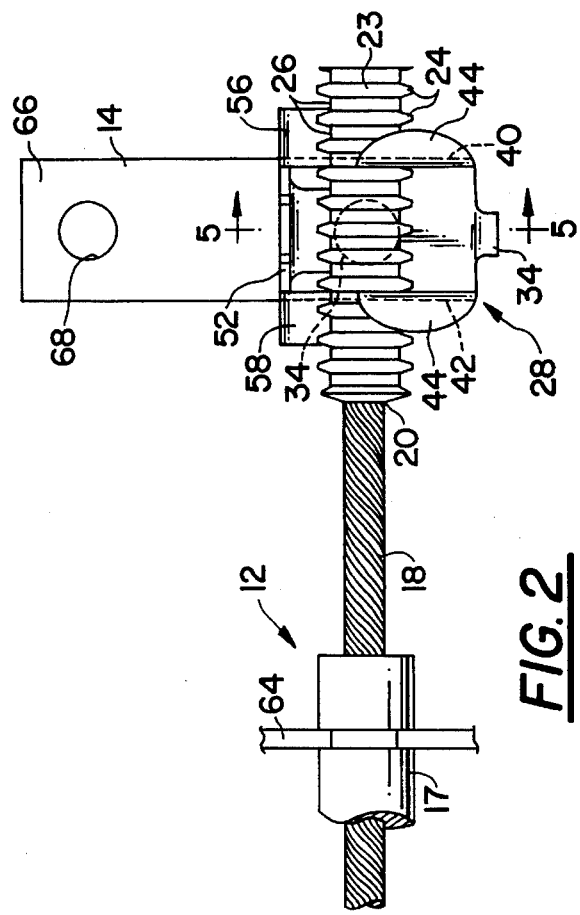

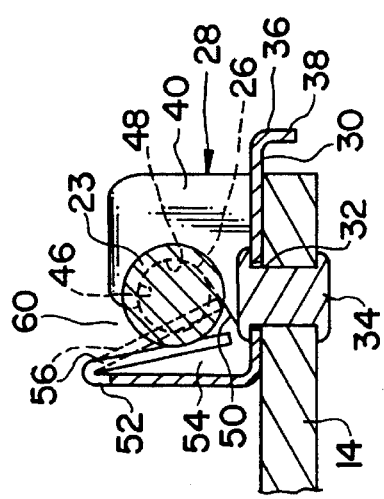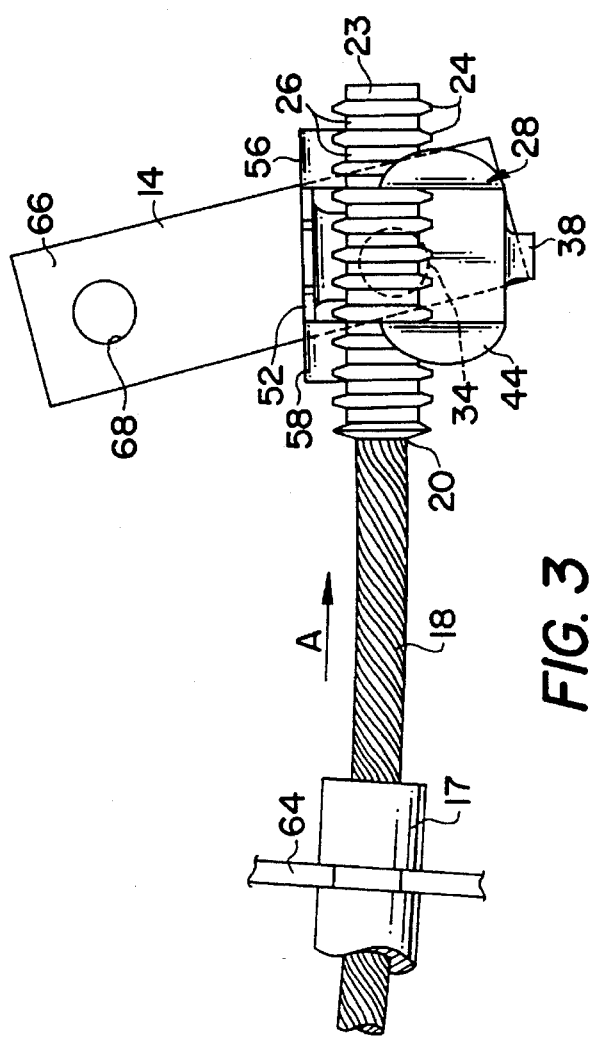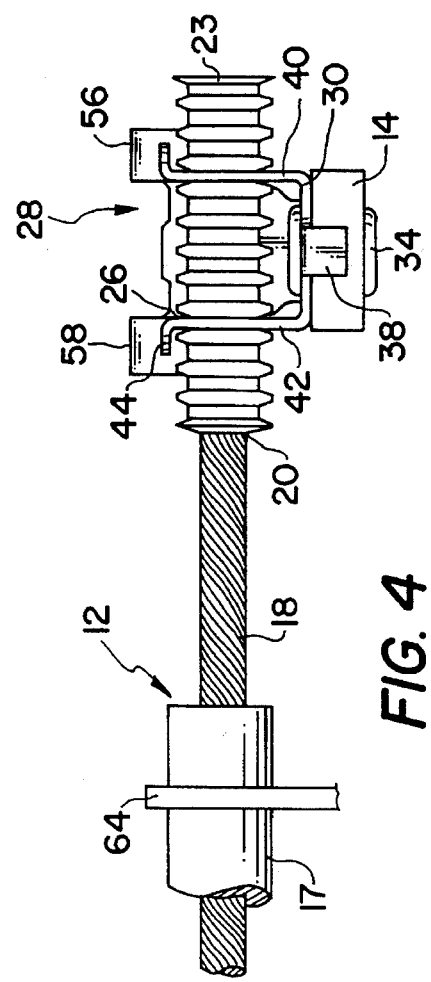

CONTROL SYSTEM WITH BOWDEN WIRE ASSEMBLY END CLIP

BACKGROUND OF THE INVENTION

This invention relates to a control system for a vehicle, such as a motor vehicle, the system embodying a Bowden wire assembly mounted between a moving actuating member and a movable actuating member, and more particularly, to improvements in the construction provided in the system for adjustably coupling the ends of the Bowden wire to the movable actuating members.

Bowden wire assemblies are utilized in vehicles in various control systems, as, for example, in vehicle doors, to connect the forwardly disposed inside latch release lever with the rearwardly disposed door latch mechanism, in vehicle seats to connect an actuating lever with a remotely operable adjusting mechanism, etc. Typically, the Bowden wire assembly is employed in control systems to actuate a remote device coupled to a distal end of the Bowden wire by manual movement of an actuator coupled to the proximal end of the wire. A Bowden wire assembly includes an outer sheath which is mounted with its ends in fixed relation and a wire movable within the sheath. In a typical installation, a distal end of the Bowden wire is coupled to the remote device and a proximal end of the Bowden wire is coupled to the actuator. The fixed mounting of the ends of the sheath insures that movement imparted to the proximal end of the Bowden wire will result in a desired corresponding movement of the Bowden wire at its distal end. In order to ensure that the Bowden wire will effect the movement of the remote device which is required, it is usual to make the connection between the distal end of the Bowden wire and the remote device an adjustable one which will allow both the actuator with its fixed connection with the proximal end of the Bowden wire and the remote device to be properly positioned before effecting the final connection thereof with the distal end of the Bowden wire. However, the proximal end may be the adjustable end. A typical arrangement for providing the adjustment is to mount a cylindrically shaped member on the remote member which has an axial bore to receive the end of the Bowden wire and a threaded opening extending radially inwardly from the periphery of the cylindrical member into communication with the bore. A set screw is then engaged within the threaded opening so as to be capable of being turned into gripping engagement with the end of the Bowden wire after it has been properly positioned therein. A problem with an adjustment of this type is that it is difficult to manually retain the parts in their desired position and at the same time screw in a set screw with a tool.

SUMMARY OF THE INVENTION

An object of the present invention is to provide a control system including a Bowden wire assembly and an arrangement for adjustably connecting one end of a Bowden wire to a movable actuator at a selectable location which can be effected with simple manual movements and without the use of a tool.

In accordance with the principles of the present invention, this objective is obtained by providing a remote control system for a vehicle or the like including a flexible Bowden wire assembly having an outer sheath and a wire movably mounted within the sheath so as to expose proximal and distal ends extending from proximal and distal ends of the sheath respectively, a first actuator mounted for movement in a first location, a second actuator mounted for movement in a remote second location, the sheath being extended between the first and second locations and having the proximal end thereof fixed in spaced relation to the first actuator and the remote end thereof fixed in spaced relation to the second actuator. One of the ends of the Bowden wire is fixed to one of the actuators. The other end of the Bowden wire has an elongated member fixed thereto so as to extend axially therefrom, the elongated member has a series of axially spaced annular grooves formed in the exterior periphery thereof. A clip is pivotally carried by the other of the actuators constructed and arranged to receive and retain the elongated member in a selected position of axial adjustment with respect thereto. The clip is formed of sheet metal and includes a base wall coupled to the actuator, and first and second spaced support walls bent outwardly from the base wall along respective bend lines disposed transversely with respect to the direction of axial adjustment so as to provide rigid transverse support for the elongated member. In addition, a side wall is bent outwardly from the base wall and is disposed generally transverse to the support walls. The side wall extends generally in the same direction as the support walls and is bent along a bend line extending longitudinally with respect to the direction of axial adjustment. The support walls, the base wall and the side wall are constructed and arranged to define a cavity extending in an axial direction of the wire, the cavity being open opposite the base wall. The side wall includes a resilient camming surface structure integrally formed therewith and extending into the cavity so as to define a holding channel between the camming surface structure and the support walls. The support walls define a pair of biting edges spaced so as to selectively engage a corresponding pair of annular grooves of the series of annular grooves of the elongated member. A width of the holding channel is less than a width of the elongated member when the camming structure is in an unbiased condition, the holding channel width being expandable upon movement of the resilient camming structure within the cavity to a biased condition. The elongated member is disposed within the expanded holding channel such that the resilient camming structure exerts a spring force thereagainst in a direction transverse to the axial direction of the wire so that the biting edges engage a pair of annular grooves, thereby holding the elongated member against movement in the direction of the extent of the wire.

Another object of the present is the provision of the control system of the type described which is simple in construction, effective in operation and economical to manufacture and maintain. These and other objects of the present invention will become apparent during the course of the following detailed description and appended claims.

BRIEF DESCRIPTION OF THE DRAWING

FIG. 1 is a front elevational view of a control system provided in accordance with the principles of the present invention, shown in a first, non-actuated position;

FIG. 2 is an enlarged front elevational view of the proximal end of the control system of FIG. 1;

FIG. 3 is view of the control system end of FIG. 2, shown in a second, actuated position;

FIG. 4 is a side elevational view of the control system end of FIG. 2; and

FIG. 5 is a partial sectional view taken along the line 5—5 in FIG. 2.

DETAILED DESCRIPTION OF THE INVENTION

Referring to FIG. 1 of the drawings, control system, generally indicated a 10, is shown. The control system 10 includes a flexible Bowden wire assembly, generally indicated at 12, extending between a proximal movable actuator 14, and a distal or remote movable actuator 16. The Bowden wire assembly 12 includes an outer sheath 17, preferably of plastic material and a wire 18 movable within the sheath 17. Wire 18 includes distal end 19 and proximal end 20, each of which extends from its respective end of the sheath 17. End 19 of the wire 18 includes a conventional ball member 21 or the like, fixed thereto by welding or the like for connecting wire end 19 to the remote actuator 16. Thus, ball member 21 is fitted in slot 22 of the remote actuator 16 to couple the wire 18 to the remote movable actuator 16. It can be appreciated that the movable actuators 14 and 16 may be configured for any particular control purpose for moving a remote member by actuation of a proximal member. Thus, the actuators 14 and 16 are shown only schematically herein.

Referring to FIGS. 2–4, exposed wire end 20 extends from the sheath 17 and includes an elongated member or grooved rod 23 which is fixed to wire 18 by welding or the like, used to couple the wire end 20 to the proximal movable actuator 14. Grooved rod 23 includes a plurality of axially spaced annular protrusions 24 defining spaced annular grooves 26 therebetween, which extend the length of the rod 23. The grooves 26 define a plurality of coupling locations, as will become apparent below.

The proximal end of the control system 10 includes a sheet metal clip, generally indicated at 28, for coupling wire end 20 to the proximal movable actuator 14. As shown in FIGS. 2, 4 and 5, the clip 28 includes a base wall 30 of generally rectangular form. The base wall 30 includes a bore 32 for receiving pin 34 for pivotally coupling the clip 28 to the movable actuator 14. End 36 of base wall 30 includes a downwardly projecting tab 38 which facilitates the assembly of the clip 28 to the movable actuator 14.

Side support posts 40 and 42 are provided in a spaced, generally parallel relation and extend outwardly and upwardly from the base wall 30. Each side support post 40 and 42 includes a flange 44 extending traversely thereto, and a biting edge 46 defined by arcuate edge 48 and cam surface 50. Cam surface 50 tappers generally upwardly from the base wall and smoothly merges with the arcuate edge 48, the function of which will become apparent below.

The clip 28 includes a side wall 52 extending outwardly from the base wall 30 in the same direction as the side support posts 40 and 42 and generally transverse thereto. Thus, base wall 30, side support posts 40 and 42, and side wall 52 define a cavity 54 extending in the axial direction of the wire 18. The cavity 54 is open opposite the base wall 30.

In the illustrated embodiment, the side wall 52 includes resilient camming surface members 56 and 58 integrally formed therewith and extending into cavity 54 so as to define a wire end holding channel 60 extending in the axial direction of the wire 18 between the camming surface members 56 and 58 and the side support posts 40 and 42, as shown in FIG. 5. Each resilient camming surface 56 and 58 is disposed in a generally opposing relation with a biting edge 46. The camming surface members 56 and 58 are movable from an unbiased position, shown by the dashed line in FIG. 5 defining a holding channel having a width less than the width of the grooved rod 23, to a sprung or biased position shown by the solid line in FIG. 5. When sprung, the resilient camming surface members 56 and 58 exert a spring force against the grooved rod 23 to hold the grooved rod 23 against biting edges 46, which will become apparent below.

In the illustrated embodiment, the resilient camming surface members 56 and 58 are integrally formed with the side wall 52. However, it can be appreciated that the camming surface members 56 and 58 may be formed integrally with the side support posts 40 and 42, while the wall 52 may include the biting edges. Further, although spaced side support posts and spaced camming surface members are shown, it can be appreciated that a single side support post and a single, cooperating resilient camming surface member may be employed.

To assemble the Bowden wire assembly 12 between the remote actuator 16 and the proximal actuator 14, the ball member 21 is first inserted into slot 22 to couple wire end 19 to the remote actuator 16. Next, the Bowden wire assembly 12 is routed to the location of the proximal actuator 14. The clip 28 is first coupled to the proximal actuator 14 at pin 34. Next, the grooved rod 23 of the Bowden wire assembly 12 is assembled to the clip 28 by inserting it into the holding channel 60. Manual force exerted on rod 23 moves resilient camming surface members 56 and 58 within cavity 54 toward the side wall 52 so as to enlarge the holding channel 60. Further insertion of the rod 23 into the holding channel 60 causes the resilient camming surface members 56 and 58 to urge rod 23 along cam surface 50 so that biting edges 46 engage associated pair of grooves 26. Thus, grooved rod 23 snaps into engagement with the biting edges 46 while the resilient camming surface members 56 and 58 exert a spring force thereagainst to hold the wire end within channel 60 and against the biting edges of the side support posts 40 and 42. As shown in FIG. 2, the side posts 40 and 42 are constructed and arranged to hold the rod 23 against movement in the direction of the extent of the wire, since the side posts 40 and 42 are disposed between adjacent protrusions 24. Further, the rod 23 is prevented from moving in a direction transverse to the wire extent direction since the arcuate edges 48 of the biting edges 26 engage an upper surface of the rod 23.

The spacing between the biting edges 46 is less than the overall length of the grooved rod 23. Thus, it can be appreciated that when assembling the grooved rod 23 to the clip 28, axial length adjustments can be made by moving rod 23 axially and selecting the desired groove location to snap the grooved rod 23 into contact with the biting edges of side posts 40 and 42. Thus, as shown in FIG. 2, biting edges engage a pair of grooves of rod 23 with the clip 28 disposed generally in the center of the rod 23. However, since the rod 23 extends beyond the extent of the clip, it can be appreciated the rod 23 may be oriented with respect to the clip 28 so as to be coupled thereto at various positions along the axial extent of the rod. Thus, the connection between the proximal end of the Bowden wire and the actuator 14 is an adjustable one, permitting both the remote actuator 16 with its fixed connection with the distal end of the Bowden wire and the actuator 14 to be properly positioned, before effecting the final connection thereof with the proximal end of the Bowden wire. It can be appreciated that the clip 28 may be employed at the distal end of the Bowden wire if desired.

Further, since the use of the clip 28 requires no tools to adjust the coupling point of the wire 18 and the actuator 14, an assembly worker can advantageously perform the assembly with only one hand by simply snapping rod 23 into position, leaving the other hand free for manually retaining parts in their desired position, if required.

To complete the assembly of the control system 10, a retaining member 64 is fastened to the periphery of the outer sheath 17 near each end thereof such that the proximal end of the sheath is fixed in spaced relation to actuator 14 and the remote end of the sheath is fixed in spaced relation with actuator 16. Thus, each retaining member 64 is constructed and arranged to be coupled to a fixed object so as to hold the sheath 17 permitting the wire 18 to be moved smoothly therein, such that movement of one actuator will cause responding movement of the other actuator via movement of the wire 18 within the sheath 17.

As noted above, the control system 10 of the invention may be employed within a vehicle door structure for unlatching the door from the door catch. Thus, for example, end 66 of the proximal movable actuator 16 may be pivotally coupled at pin 68 to a manually movable member (not shown), such as a vehicle door handle, which extends through the exterior panel of the door. End 70 of the remote actuator may be pivotally coupled to a door latch mechanism at pin 72. The operation of the control system is as follows. Manual movement of the movable member causes proximal movable actuator 14 to pivot from its first position (FIG. 2) about pin 68, thus causing tension in the wire 18 and moving it in the direction of arrow A in FIG. 3. Movement of wire 18 at end 20 results in responding movement of the remote movable actuator 16 from its first position (FIG. 1) to its actuated position (not shown). The movement of the remote actuator 16 can then be used, for example, to release a latch mechanism from engagement with the vehicle door catch.

It has thus been shown that the control system of the present invention provides a simple and effective means of coupling a wire end of a Bowden wire assembly to a movable actuator at selected positions along the axial length of the wire, without requiring tools.

It thus will be appreciated that the objects of this invention have been fully and effectively accomplished. It will be realized, however, that the foregoing preferred embodiment of the present invention has been shown and described for the purpose of illustrating the structural and functional principles of the present invention and is subject to change without departure from such principles. Therefore, this invention includes all the modifications encompassed within the spirit of the following claims.

What is claimed is:

1. A remote control system for a vehicle comprising:

a flexible Bowden wire assembly having an outer sheath and a wire movably mounted within said sheath so as to expose proximal and distal ends of said wire extending from proximal and distal ends of said sheath respectively, a first actuator mounted for movement in a first location, a second actuator mounted for movement in a remote second location, said sheath being extended between said first and said second locations and having the proximal end thereof fixed in spaced relation to said first actuator and the distal end thereof fixed in spaced relation to said second actuator, one of the ends of said wire being fixed to one of said actuators, the other of the ends of said wire having an elongated member fixed thereto so as to extend axially therefrom, said elongated member having a series of axially spaced annular grooves formed in its exterior periphery, and a clip pivotally carried by the other of said actuators constructed and arranged to receive and retain said elongated member in a selected position of axial adjustment with respect thereto, said clip being formed of sheet metal and comprising:

a base wall coupled to said other actuator, separate first and second support walls each being bent outwardly from said base wall along respective bend lines disposed transversely with respect to the direction of axial adjustment so as to provide rigid transverse support for said elongated member, said support walls being in spaced relation with respect to one another in the direction of axial adjustment, and a side wall bent outwardly from said base wall so as to extend in generally the same direction as said support walls, said side wall being bent along a bend line extending longitudinally with respect to the direction of axial adjustment and disposed generally transverse to said support walls so as to provide rigid longitudinal support for the elongated member, said support walls, said base wall and said side wall being constructed and arranged to define a cavity extending in an axial direction of the wire, said cavity being open opposite said base wall, said side wall including a resilient camming surface structure integrally formed therewith and extending into said cavity so as to define a holding channel between said resilient camming surface structure and said support walls, said support walls defining a pair of biting edges spaced so as to engage surfaces defining a corresponding pair of annular grooves of said series of annular grooves at a selected axial position with respect to said elongated member, a width of said holding channel being less than a width of said elongated member when said resilient camming surface structure is in an unbiased condition, said holding channel width being expanding upon movement of said resilient camming surface structure within said cavity to a biased condition, said elongated member being disposed within said expanded holding channel such that said resilient camming surface structure exerts a spring force thereagainst in a direction transverse to the axial direction of the wire so that said biting edges engage said surfaces defining a corresponding pair of annular grooves at said selected axial position, thereby holding said elongated member against movement in the axial direction of the wire.

2. The control system as defined in claim 1, wherein said elongated member is a cylindrical rod, said rod having a plurality of annular protrusions extending from an exterior periphery thereof and disposed along the axial direction of the wire, an annular groove of said series of annular grooves being defined between two adjacent protrusions of said plurality of annular protrusions.

3. The control system as defined in claim 2, wherein each of said biting edges is defined by a cam edge tapering generally upwardly in a direction from said base wall and an arcuate edge smoothly merging with said cam edge, said arcuate edges having a curvature constructed and arranged to mate with a curvature of said rod so that said biting edges disposed in said corresponding pair of annular grooves hold said rod against movement in the axial direction of the wire.

4. The control system as defined in claim 3, wherein said biting edges are constructed and arranged to engage said rod so as to prevent movement thereof in a direction generally transverse to the axial direction of the wire.

5. The control system according to claim 1, wherein said proximal and said distal ends of said sheath are fixed by retaining members.

6. The control system as defined in claim 1, wherein said biting edges of said support walls are spaced a distance less than an axial extent of said elongated member, said series of annular grooves extending along the entire said axial extent of said elongated member so as to permit said biting edges to engage surfaces defining a selected pair of said series of annular grooves at various positions along the axial extent of said elongated member.

7. The control system as defined in claim 1, wherein said resilient camming surface structure includes spaced first and second camming surfaces, each of said camming surfaces being disposed in a generally opposing relation to one of said biting edges of said support walls.

8. The control system as defined in claim 1, wherein said elongated member is welded to said other end of said wire.

* * * * *